United States Patent
Ikeno et al.

(10) Patent No.: US 7,271,215 B2
(45) Date of Patent: Sep. 18, 2007

(54) ADDITION REACTION-CURABLE LIQUID SILICONE RUBBER COMPOSITIONS AND PROCESS OF PREPARING SAME

(75) Inventors: Masayuki Ikeno, Gunma-ken (JP); Shigeki Shudo, Gunma-ken (JP); Naoki Yamakawa, Gunma-ken (JP); Yujiro Taira, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 277 days.

(21) Appl. No.: 11/151,255

(22) Filed: Jun. 14, 2005

(65) Prior Publication Data

US 2005/0277725 A1     Dec. 15, 2005

(30) Foreign Application Priority Data

Jun. 15, 2004  (JP)  ............................. 2004-176424
Jun. 15, 2004  (JP)  ............................. 2004-176432

(51) Int. Cl.
*C08L 83/04* (2006.01)

(52) U.S. Cl. .................. 524/588; 528/15; 528/31; 528/32; 428/405; 525/477; 525/478; 525/479

(58) Field of Classification Search .............. None
See application file for complete search history.

(56) References Cited

U.S. PATENT DOCUMENTS 5,519,082 A     5/1996  Yoshino
6,245,875 B1 *  6/2001  Wang ........................... 528/25
2001/0039323 A1 * 11/2001  Achenbach et al. ........... 528/15
2004/0132947 A1 *  7/2004  Achenbach et al. ........... 528/15

FOREIGN PATENT DOCUMENTS

| EP | 0 305 073 A2 | 3/1989 |
| EP | 0 622 421 A2 | 11/1994 |
| EP | 0 669 376 A2 | 8/1995 |
| EP | 0 798 342 A2 | 10/1997 |
| JP | 7-331079 A | 12/1995 |

* cited by examiner

*Primary Examiner*—Marc S. Zimmer
(74) *Attorney, Agent, or Firm*—Birch, Stewart, Kolasch & Birch, LLP

(57) ABSTRACT

An addition reaction-curable liquid silicone rubber composition includes an organopolysiloxane containing at least one Si-bonded vinyl group only at each end of its backbone and having a viscosity of from 1 to 1,000 Pa·s at 25° C., an organopolysiloxane containing at least two Si-bonded vinyl groups only in side chains on its backbone and having a viscosity of from 0.1 to 100 Pa·s at 25° C., the amount of siloxane units bonded to the vinyl groups being from 2 to 20 mole % of its total siloxane units, finely divided silica having a specific surface area of at least 50 m$^2$/g, hexamethyldisilazane, water, an organohydrogenpolysiloxane containing at least two Si-bonded hydrogen atoms per molecule, and a hydrosilation catalyst. Another addition reaction-curable liquid silicone rubber composition additionally includes a specific non-functional dimethylpolysiloxane. The silicone rubber compositions are cured into products having a hardness of at least 75 as measured by a type-A durometer and an elongation at break of at least 200%.

4 Claims, No Drawings

ADDITION REACTION-CURABLE LIQUID SILICONE RUBBER COMPOSITIONS AND PROCESS OF PREPARING SAME

CROSS-REFERENCE TO RELATED APPLICATION

This non-provisional application claims priority under 35 U.S.C. §119(a) on Patent Application Nos. 2004-176424 and 2004-176432 filed in Japan on Jun. 15, 2004 and Jun. 15, 2004, respectively, the entire contents of which are hereby incorporated by reference.

FIELD OF THE INVENTION

This invention relates to addition reaction-curable liquid silicone rubber compositions which can be cured into silicone rubber products having a high hardness and a high elongation, and also to a process for preparing the same.

BACKGROUND OF THE INVENTION

Liquid silicone rubbers are excellent in physiological inertness (non-toxicity), weatherability and release properties, heat resistance, and therefore, are widely used in various fields of medical cares, foods, industrial art objects, electric/electronic parts, automobiles, office equipment, etc. Silicone rubber materials especially for use in food-related applications are required to have a hardness of 75 or higher as measured by a type-A durometer and an elongation at break of 200% or greater. A silicone rubber having a high hardness is generally obtained by filling an inorganic filler at a high concentration. The high-concentration filling of the inorganic filler, however, makes it difficult to bring about any large elongation, so that the use of the resulting silicone rubber is limited to insulation potting applications for electric/electronic parts. JP-A 7-331079 corresponding to U.S. Pat. No. 5,519,082 discloses a high-hardness, high-strength rubber which is obtained by using a silicone raw rubber and a silicone resin. Due to the use of the silicone raw rubber, however, the rubber involves a problem that it cannot be used for liquid-molding or liquid-forming applications.

SUMMARY OF THE INVENTION

An object of the present invention is therefore to provide an addition reaction-curable liquid silicone rubber composition which affords a silicone rubber having a high hardness and a high elongation, and a process for preparing the same.

To achieve the above objects, the present inventors have proceeded with an extensive investigation, resulting in the present invention.

In a first aspect of the present invention, there is provided an addition reaction-curable liquid silicone rubber composition capable of imparting a cured product having a high hardness comprising, (A) 80 to 90% by weight, based on the sum of component (A) and component (B), of an organopolysiloxane containing at least one Si-bonded vinyl group only at each end of a backbone thereof and having a viscosity of from 1 to 1,000 Pa·s at 25° C., (B) 10 to 20% by weight, based on the sum of component (A) and component (B), of an organopolysiloxane containing at least two Si-bonded vinyl groups only in side chains on a backbone thereof and having a viscosity of from 0.1 to 100 Pa·s at 25° C., the amount of siloxane units having the vinyl groups being from 2 to 20 mole % of the total siloxane units of organopolysiloxane (B), (D) 35 to 55 parts by weight, per 100 parts by weight of the sum of component (A) and component (B), of finely divided silica having a specific surface area of at least 50 $m^2/g$, (E) 3 to 15 parts by weight, per 100 parts by weight of the sum of component (A) and component (B), of hexamethyldisilazane, (F) 0.5 to 5 parts by weight, per 100 parts by weight of the sum of component (A) and component (B), of water, (G) an organohydrogenpolysiloxane containing at least two Si-bonded hydrogen atoms per molecule, the organohydrogenpolysiloxane being contained in a proportion such that the number of the Si-bonded hydrogen atoms contained per molecule of component (F) becomes from 1.0 to 5.0 per each Si-bonded vinyl group contained in the organopolysiloxanes of component (A) and component (B), and (H) a catalytic amount of a hydrosilation catalyst;

the silicone rubber composition being cured into a product having a hardness of at least 75 as measured by a type-A durometer and an elongation at break of at least 200%.

In a second aspect of the present invention, there is also provided a process for preparing an addition reaction-curable liquid silicone rubber composition comprising, (A) 80 to 90% by weight, based on the sum of component (A) and component (B), of an organopolysiloxane containing at least one Si-bonded vinyl group only at each end of a backbone thereof and having a viscosity of from 1 to 1,000 Pa·s at 25° C., (B) 10 to 20% by weight, based on the sum of component (A) and component (B), of an organopolysiloxane containing at least two Si-bonded vinyl groups only in side chains on a backbone thereof and having a viscosity of from 0.1 to 100 Pa·s at 25° C., the amount of siloxane units having the vinyl groups being from 2 to 20 mole % of the total siloxane units of organopolysiloxane (B), (D) 35 to 55 parts by weight, per 100 parts by weight of the sum of component (A) and component (B), of finely divided silica having a specific surface area of at least 50 $m^2/g$, (E) 3 to 15 parts by weight, per 100 parts by weight of the sum of component (A) and component (B), of hexamethyldisilazane, (F) 0.5 to 5 parts by weight, per 100 parts by weight of the sum of component (A) and component (B), of water, (G) an organohydrogenpolysiloxane containing at least two Si-bonded hydrogen atoms per molecule, the organohydrogenpolysiloxane being contained in a proportion such that the number of the Si-bonded hydrogen atoms contained per molecule of component (F) becomes from 1.0 to 5.0 per each Si-bonded vinyl group contained in the organopolysiloxanes of component (A) and component (B), and (H) a catalytic amount of a hydrosilation catalyst;

wherein the process of preparing the silicone rubber composition comprises the following first to fourth steps (1) to (4):

(1) kneading at a temperature of up to 100° C. at least a portion of component (A) and at least a portion of component (B), with proviso that the portions of component (A) and component (B) are not the whole portions thereof at the same time, and the whole portions of components (D), (E) and (F);

(2) adding at least portion(s) of any remaining portion(s) of component (A) and component (B) to a mixture obtained in step (1), and kneading the resulting mixture at a temperature of up to 100° C.;

(3) subjecting the mixture, which has been obtained in step (2), to heat treatment at from 130 to 200° C.; and (4) kneading, in the mixture subjected to the heat treatment, the whole portions of components (G) and (H) and any remaining portion(s) of component (A) and component (B) at the end of the step (2).

In a third aspect of the present invention, there is further provided an addition reaction-curable liquid silicone rubber composition comprising, (A) 70 to 89% by weight, based on the sum of component (A), component (B) and component (C), of an organopolysiloxane containing at least one Si-bonded vinyl group only at each end of a backbone thereof and having a viscosity of from 1 to 1,000 Pa·s at 25° C., (B) 10 to 20% by weight, based on the sum of component (A), component (B) and component (C), of an organopolysiloxane containing at least two Si-bonded vinyl groups only in side chains on a backbone thereof and having a viscosity of from 0.1 to 100 Pa·s at 25° C., the amount of siloxane units having the vinyl groups being from 2 to 20 mole % of the total siloxane units of organopolysiloxane (B), (C) 1 to 10% by weight, based on the sum of component (A), component (B) and component (C), of a non-functional dimethylpolysiloxane represented by the following formula (3):

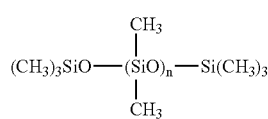

wherein n denotes a number sufficient to give polysiloxane (G) a viscosity of from 0.01 to 1 Pa·s at 25° C., (D) 35 to 55 parts by weight, per 100 parts by weight of the sum of component (A), component (B) and component (C), of finely divided silica having a specific surface area of at least 50 m²/g, (E) 3 to 15 parts by weight, per 100 parts by weight of the sum of component (A), component (B) and component (C), of hexamethyldisilazane, (F) 0.5 to 5 parts by weight, per 100 parts by weight of the sum of component (A), component (B) and component (C), of water, (G) an organohydrogenpolysiloxane containing at least two Si-bonded hydrogen atoms per molecule, the organohydrogenpolysiloxane being contained in a proportion such that the number of the Si-bonded hydrogen atoms contained per molecule of component (G) becomes from 1.0 to 5.0 per each Si-bonded vinyl group contained in the organopolysiloxanes of component (A) and component (B), and (H) a catalytic amount of a hydrosilation catalyst;
the silicone rubber composition being cured into a product having a hardness of at least 75 as measured by a type-A durometer and an elongation at break of at least 200%.

In a fourth aspect of the present invention, there is still further provided a process for preparing an addition reaction-curable liquid silicone rubber composition comprising, (A) 70 to 89% by weight, based on the sum of component (A), component (B) and component (C), of an organopolysiloxane containing at least one Si-bonded vinyl group only at each end of a backbone thereof and having a viscosity of from 1 to 1,000 Pa·s at 25° C., (B) 10 to 20% by weight, based on the sum of component (A), component (B) and component (C), of an organopolysiloxane containing at least two Si-bonded vinyl groups only in side chains on a backbone thereof and having a viscosity of from 0.1 to 100 Pa·s at 25° C., the amount of siloxane units having the vinyl groups being from 2 to 20 mole % of the total siloxane units of organopolysiloxane (B), (C) 1 to 10% by weight, based on the sum of component (A), component (B) and component (C), of a non-functional dimethylpolysiloxane represented by the following formula (3):

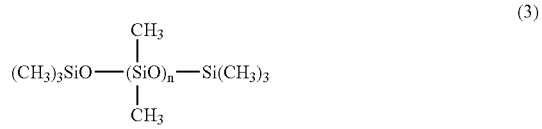

wherein n denotes a number sufficient to give polysiloxane (G) a viscosity of from 0.01 to 1 Pa·s at 25° C., (D) 35 to 55 parts by weight, per 100 parts by weight of the sum of component (A), component (B) and component (C), of finely divided silica having a specific surface area of at least 50 m²/g, (E) 3 to 15 parts by weight, per 100 parts by weight of the sum of component (A), component (B) and component (C), of hexamethyldisilazane, (F) 0.5 to 5 parts by weight, per 100 parts by weight of the sum of component (A), component (B) and component (C), of water, (G) an organohydrogenpolysiloxane containing at least two Si-bonded hydrogen atoms per molecule, the organohydrogenpolysiloxane being contained in a proportion such that the number of the Si-bonded hydrogen atoms contained per molecule of component (G) becomes from 1.0 to 5.0 per each Si-bonded vinyl group contained in the organopolysiloxanes of component (A) and component (B), and (H) a catalytic amount of a hydrosilation catalyst;
wherein the process of preparing the silicone rubber composition comprises the following first to third steps (1) to (3):

(1) kneading at a temperature of up to 100° C. a portion of component (A), at least a portion of component (B), at least a portion of component (C), and the whole portions of components (D), (E) and (F);

(2) subjecting a kneaded compound, which has been obtained in step (1), to heat treatment at from 130 to 200° C.; and (3) kneading, in the kneaded compound subjected to the heat treatment, the whole portions of components (G) and (H), the remaining portion of component (A), and any remaining portion(s) of component (B) and component (C).

Upon production of a liquid silicone rubber composition, the adoption of one of the above-mentioned specific production processes according to the present invention makes it possible to provide the liquid silicone rubber composition which is cured into a cured product having a hardness of at least 75 as measured by a type-A durometer and an elongation at break of at least 200%.

DETAILED DESCRIPTION OF THE INVENTION

Component (A)

In the liquid silicone rubber compositions according to the first and third aspects of the present invention, the organopolysiloxane as component (A) is generally a linear diorganopolysiloxane, the backbone (or main chain) of which is formed of a repeat of diorganosiloxane units and is capped at both ends thereof with triorganosiloxy groups, respectively. The organopolysiloxane may contain branched structure(s) in part(s) thereof. The organopolysiloxane is a base polymer for the liquid silicone rubber composition, and contains at least one Si-bonded vinyl group only at each end of the backbone. More specifically, the vinyl groups are bonded only to the silicon atoms of both ends of the backbone among the silicon atoms which constitute siloxane main chain structures (Si—O—Si). In this case, the silicon atom at each end of the backbone carries at least one vinyl group bonded thereto. The organopolysiloxane has a viscosity of from 1 to 1,000 Pa·s, preferably from 5 to 100 Pa·s, more preferably from 10 to 50 Pa·s at 25° C. In the present invention the viscosity is measured by rotational viscometry. Examples of organic groups bonded to silicon atoms other than the above-described vinyl groups, the organic groups each being to be represented by R, include substituted or unsubstituted monovalent hydrocarbon groups having 1 to 12 carbon atoms in general, preferably 1 to 8 carbon atoms other than alkenyl groups, such as alkyl groups such as methyl, ethyl, propyl, isopropyl, butyl, isobutyl, tert-butyl, hexyl, cyclohexyl, octyl and dodecyl; aryl groups such as phenyl and tolyl; aralkyl groups such as benzyl, β-phenylethyl and β-phenylpropyl; and halogen-substituted hydrocarbon groups such as 3,3,3-trifluoropropyl. Among these, methyl groups are preferred because the corresponding organopolysiloxane can be readily synthesized. Illustrative of the organopolysiloxane as component (A) are those represented by the following formula (1):

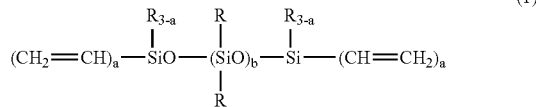

wherein letter a is an integer of from 1 to 3, letter b stands for a number of from 10 to 2,000 that satisfies the above-described viscosity, and R is a substituted or unsubstituted, monovalent hydrocarbon group other than an alkenyl group as exemplified above.

More specifically, the following organopolysiloxanes can be exemplified:

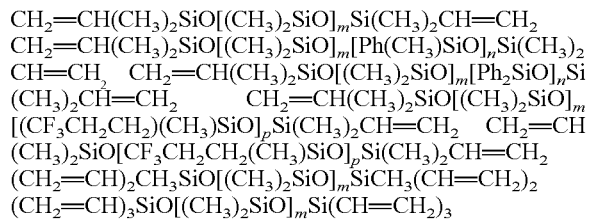

wherein Ph represents a phenyl group, and m, n and p individually stand for positive integers that satisfy the above-described viscosity.

Component (B)

The organopolysiloxane as component (B) is generally a linear diorganopolysiloxane, the backbone (or main chain) of which is formed of a repeat of diorganosiloxane units and is capped at both ends thereof with triorganosiloxy groups, respectively. The organopolysiloxane may contain branched structure(s) in part(s) thereof. This organopolysiloxane contains at least two Si-bonded vinyl groups only in side chains on a backbone thereof. More specifically, at least two vinyl groups are bonded only as substituent groups to silicon atoms at intermediate sites of the backbone (in other words, at non-end sites of the backbone) among the silicon atoms constituting siloxane main chain structures (Si—O—Si). The amount of siloxane units bonded to the vinyl groups is from 2 to 20 mole %, particularly from 5 to 10 mole % of the total siloxane units of the organopolysiloxane. The organopolysiloxane has a viscosity of from 0.1 to 100 Pa·s, preferably from 0.5 to 10 Pa·s, more preferably from 0.5 to 5 Pa·s at 25° C.

Component (B) is an essential component for imparting a cured product having a high hardness. The above-described vinyl groups as side-chain substituent groups are generally contained as bifunctional siloxane units (diorganosiloxane units). If the amount of such vinyl-bonded siloxane units is smaller than 2 mole % of the total siloxane units, the composition can hardly be provided with a high hardness after curing. An amount of such vinyl-bonded siloxane units greater than 20 mole %, on the other hand, conversely induces a reduction in elongation.

It is to be noted that among organic groups bonded to the silicon atoms, those other than vinyl groups are similar to the unsubstituted or substituted monovalent hydrocarbon groups R other than alkenyl groups, which have been exemplified above in connection with component (A).

Illustrative of the organopolysiloxane as component (B) are those represented by the following formula (2):

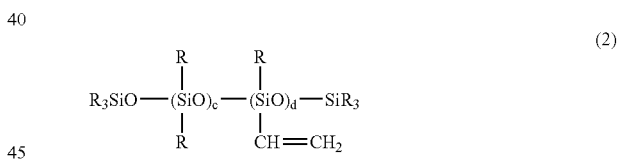

wherein R has the same meaning as defined above, letter c stands for a positive integer, letter d is an integer of 2 or more, and c+d is a value sufficient to satisfy the above-described viscosity.

More specifically, the following organopolysiloxanes can be exemplified:

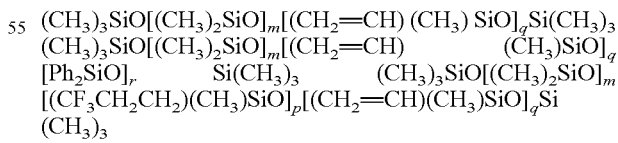

wherein Ph represents a phenyl group, and m, p, q and r individually stand for positive integers that satisfy the above-described viscosity, with a proviso that q is 2 or greater.

Component (C)

Component (C) is a non-functional dimethylpolysiloxane represented by the following formula (3):

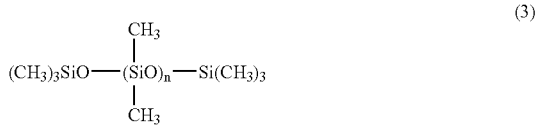

(3)

wherein n denotes a number sufficient to give the polysiloxane a viscosity of from 0.01 to 1 Pa·s at 25° C. The non-functional dimethylsiloxane means that it takes no part in the crosslinking reaction between the silicon-bonded vinyl groups in component (A) and component (B) and the SiH groups in component (G). The non-functional dimethylpolysiloxane serves to prevent aggregations of the filler (D) during heat treatment of a compound containing the filler. The viscosity of this polysiloxane is from 0.01 to 1 Pa·s, preferably from 0.05 to 0.5 Pa·s at 25° C.

In the liquid silicone rubber composition according to the first aspect of the present invention, the linear diorganopolysiloxane as a base polymer of the composition consist of components (A) and (B) without component (C). The proportions of components (A) and (B) are from 80 to 90% by weight and from 10 to 20% by weight, respectively, based on the sum (100% by weight) of components (A) and (B). A proportion of component (B) smaller than 10% by weight makes it difficult to obtain a hardness of at least 75, while a proportion of component (B) greater than 20% by weight leads to a significant reduction in elongation.

In the liquid silicone rubber composition according to the third aspect of the present invention, on the other hand, the linear diorganopolysiloxane as a base polymer of the composition consist of components (A), (B) and (C). The proportions of components (A) and (B) are from 70 to 89% by weight and from 10 to 20% by weight, respectively, based on the sum (100% by weight) of components (A), (B) and (C). A proportion of component (B) smaller than 10% by weight makes it difficult to obtain a hardness of at least 75, while a proportion of the component (B) greater than 20% by weight leads to a significant reduction in elongation. Further, the proportion of component (C) is from 1 to 10% by weight. A proportion of component (C) smaller than 1% by weight is not effective for the prevention of aggregations of filler particles, while a proportion of the component greater than 10% by weight can hardly provide high hardness.

Component (D)

Component (D) is finely-divided silica including $SiO_2$ as a principal component thereof and having a specific surface area of at least 50 $m^2/g$ as measured by BET adsorption method, and is added to provide the composition with strength. To provide the silicone rubber with reinforcement, the specific surface area as measured by BET adsorption method needs to be controlled to at least 50 $m^2/g$, generally from 50 to 400 $m^2/g$, preferably from 100 to 350 $m^2/g$. Examples of the finely-divided silica include hydrophilic silica such as "Aerosil™ 130", "Aerosil™ 200" and "Aerosil™ 300" (products of Nippon Aerosil Co., Ltd.), "Rheorosil™ QS-102" and "Rheorosil™ QS-103" (products of TOKUYAMA Corp.), and "Nipsil™ LP" (product of TOSOH SILICA CORPORATION); and hydrophobic silica such as "Aerosil™ R812" and "Aerosil™ R972" (products of Degussa AG), "Rheorosil™ MT-10" (product of TOKUYAMA Corp.), and "Nipsil™ SS" series (products of TOSOH SILICA CORPORATION). They can be used either singly or in combination.

The proportion of component (D) is from 35 to 55 parts by weight per 100 parts by weight of the sum of the component (A), component (B) and component (C). The proportion of component (C) may be 0 part by weight (this will be the same hereinafter). A proportion of component (D) smaller than 35 parts by weight cannot obtain a sufficient strength, while a proportion of the component (D) greater than 55 parts by weight leads to a substantial rise in viscosity so that the resulting composition cannot be used as a liquid-molding or liquid-forming material.

Component (E)

Hexamethyldisilazane as component (E) is a compound represented by $(CH_3)_3SiNHSi(CH_3)_3$. This component applies surface treatment to component (D) to improve wettability and dispersibility of component (D) to components (A), (B) and (C), and therefore plays a role to fluidize the composition. The proportion of component (E) is from 3 to 15 parts by weight per 100 parts by weight of component (A), component (B) and component (C). A proportion of component (E) smaller than 3 parts by weight makes it impossible to sufficiently conduct the surface treatment of component (D), while a proportion of component (E) greater than 15 parts by weight is too excessive from the standpoint of economy.

Component (F)

Water as component (F) plays a role to accelerate the decomposition of component (E) and hence, to increase the surface treatment speed of component (D). The proportion of component (F) is from 0.5 to 5 parts by weight per 100 parts by weight of component (A), component (B) and component (C). A proportion of component (F) greater than 5 parts by weight is not expected to bring about any extra improvements in properties, and moreover, requires a longer step to remove water subsequent to the completion of the heat treatment of the silicone rubber composition and is not preferred from the standpoint of productivity.

Component (G)

The organohydrogenpolysiloxane as component (G) is a crosslinking agent for the composition, and contains at least two, preferably at least three silicon-bonded hydrogen atoms (SiH groups) per molecule. The sites to which the Si-bonded hydrogen atoms in component (G) are bonded are the ends of its backbone and/or side chains of its backbone. Organic groups bonded to silicon atoms in component (G) can be the same substituted or unsubstituted, monovalent hydrocarbon groups R other than alkenyl groups in component (A). Examples of such organic groups include alkyl groups such as methyl, ethyl, propyl, isopropyl, butyl, isobutyl, tert-butyl, cyclohexyl, octyl, pentyl, hexyl and heptyl; aryl groups such as phenyl, tolyl, xylyl and naphthyl; aralkyl groups such as benzyl and phenethyl; and halogenated alkyl groups such as chloromethyl, 3-chloropropyl and 3,3,3-trifluoropropyl. Among these, alkyl groups and aryl groups, especially methyl group and phenyl group are preferred.

The molecular structure of component (G) as described above can be, for example, a linear, cyclic, branched, or three-dimensional network structure.

The organohydrogenpolysiloxane as component (G) may be one represented by the following average compositional formula (4):

$$R_eH_fSiO_{(4-e-f)/2} \qquad (4)$$

wherein R represents a substituted or unsubstituted, monovalent hydrocarbon group having 1 to 10 carbon atoms, letter e is from 0.7 to 2.1, letter f is from 0.001 to 1.0, and e+f is a positive number satisfying from 0.8 to 3.0, preferably, letter e is from 0.9 to 2.0, letter f is from 0.01 to 1.0, and e+f is from 1.0 to 2.5, and containing at least two, preferably at least three (generally from about 3 to about 200), more preferably from 3 to 100 Si-bonded hydrogen atoms (SiH groups) per molecule.

It is to be noted that R can be the same group as the unsubstituted or substituted, monovalent hydrocarbon group other than an alkenyl group and is similar to the Rs in component (A) and component (B).

Examples of the organohydrogenpolysiloxane include 1,1,3,3-tetramethyldisiloxane, 1,3,5,7-tetramethylcyclotetrasiloxane, both end trimethylsiloxy-terminated methylhydrogenpolysiloxane, both end trimethylsiloxy-terminated dimethylsiloxane-methylhydrogensiloxane copolymer, both end dimethylhydrogensiloxy-terminated dimethylpolysiloxane, both end dimethylhydrogensiloxy-terminated dimethylsiloxane-methylhydrogensiloxane copolymer, both end dimethylhydrogensiloxy-terminated dimethylsiloxane-methylhydrogensiloxane-diphenylsiloxane terpolymer, both end trimethylsiloxy-terminated methylhydrogensiloxane-diphenylsiloxane copolymer, both end trimethylsiloxy-terminated methylhydrogensiloxane-diphenylsiloxane-dimethylsiloxane terpolymer, copolymers formed of $(CH_3)_2HSiO_{1/2}$ units and $SiO_{4/2}$ units, copolymers formed of $(CH_3)_2HSiO_{1/2}$ units, $(CH_3)_3SiO_{1/2}$ units and $SiO_{4/2}$ units, and copolymers formed of $(CH_3)_2HSiO_{1/2}$ units, $SiO_{4/2}$ units and $(C_6H_5)SiO_{3/2}$ units.

The number of silicon atoms per molecule (or the polymerization degree) of the organohydrogenpolysiloxane may be preferably from 2 to 1,000, especially from 3 to 300, although its molecular structure can be any one of linear, cyclic, branched and three-dimensional network structures. As component (G), the above-exemplified organohydrogenpolysiloxanes can be used either singly or in combination.

The viscosity of component (G) at 25° C. may preferably be in a range of from 1 to 1,000 mPa·s, with a range of from 5 to 500 mPa·s being particularly preferred, because the resulting silicone rubber has good physical properties and the composition has good handling and workability.

Component (G) may be added preferably in such a proportion that the number of Si-bonded hydrogen atoms in component (G) falls within a range of from 1 to 5, especially from 1 to 3 per each Si-bonded vinyl group in component (A) and component (B). If the number of Si-bonded hydrogen atom(s) in component (G) is less than 1 per each Si-bonded vinyl group in component (A) and component (B), a high hardness cannot be obtained sufficiently. If the number of such Si-bonded hydrogen atoms exceeds 5, excessive SiH groups remain to become a cause of a reduction in elongation.

Component (H)

No particular limitation is imposed on the hydrosilation catalyst for use as component (H) in the present invention insofar as it promotes the addition reaction between the vinyl groups in component (A) and component (B) and the SiH groups in component (G). Usable examples include platinum-, palladium- and rhodium-based compounds, such as chloroplatinic acid, alcohol-modified chloroplatinic acids, coordination compounds between chloroplatinic acid and olefins, vinylsiloxane or acetylene compounds, tetrakis (triphenylphosphine)palladium, and chlorotris(triphenylphosphine)rhodium, with platinum-based compounds being particularly preferred.

Component (H) can be added in a proportion of from 1 to 1,000 ppm, preferably from 1 to 500 ppm in terms of the catalytic metal element based on the sum of components (A) and (B), with the use of component (H) in a range of from 10 to 100 ppm being more preferred. A proportion smaller than 1 ppm results in a considerably slow addition reaction, whereas a proportion greater than 1,000 ppm is excessive and is not preferred from the standpoint of economy.

Preparation Process

In the process according to the second aspect of the present invention, an addition reaction-curable liquid silicone rubber composition is produced by adopting the following first to fourth steps (1) to (4):

(1) kneading at a temperature of up to 1000° C. at least a portion of component (A) and at least a portion of component (B), with a proviso that the portions of component (A) and component (B) are not the whole portions thereof at the same time, and the whole portions of components (D), (E) and (F);

(2) adding at least portion(s) of any remaining portion(s) of component (A) and component (B) to a mixture obtained in the step (1), and kneading the resulting mixture at a temperature of up to 100° C.;

(3) subjecting the mixture, which has been obtained in the step (2), to heat treatment at from 130 to 200° C.; and (4) kneading, in the mixture subjected to the heat treatment, the whole portions of components (G) and (H) and any remaining portion(s) of component (A) and component (B) at the end of the step (2).

In the process according to the fourth aspect of the present invention, on the other hand, an addition reaction-curable liquid silicone rubber composition is produced by adopting the following first to third steps (1) to (3):

(1) kneading at a temperature of up to 100° C. a portion of component (A), at least a portion of component (B), at least a portion of component (C), and the whole portions of components (D), (E) and (F);

(2) subjecting a kneaded compound, which has been obtained in the step (1), to heat treatment at from 130 to 200° C.; and (3) kneading, in the kneaded compound subjected to the heat treatment, the whole portions of components (G) and (H), the remaining portion of component (A), and any remaining portion(s) of component (B) and component (C).

In the first step of each of the processes according to the second and fourth aspects of the present invention, the individual components are kneaded at a temperature not higher than 100° C., preferably not higher than 80° C. The kneading can be conducted at room temperature (for example, 10 to 30° C.) without requiring any specific heating from the outside. It is only required to control the exothermic heat produced by frictional resistance during the kneading such that the temperature in the system is maintained below 100° C., especially below 80° C. Kneading at a temperature higher than 100° C. leads to firm sticking of the oil components on the finely-divided silica, and hence, results in insufficient dispersion of the finely-divided silica.

The total proportion of components (A) and (B), which are kneaded in the first step of the process according to the second aspect of the present invention, is generally from 60 to 85% by weight, preferably from 60 to 80% by weight, particularly from 65 to 75% by weight based on the sum (100% by weight) of components (A) and (B). A total proportion smaller than 60% by weight may not be able to provide a sufficient elongation in some instances, while a total proportion greater than 85% by weight may result in a composition and cured product having inferior clearness or transparency. Insofar as the above-described respective proportions of components (A) and (B) are satisfied, in other words, except for the case that component (A) and component (B) are both added in their entireties, at least a portion of component (A) and at least a portion of component (B) are provided for the kneading in the first step. For example, a portion of component (A) may be left unadded pending the kneading in the subsequent second step and/or fourth step, and the remaining portion of component (A) and the whole portion of component (B) may be provided for the kneading in the first step. As another example, a portion of component (B) may be left unadded pending the kneading in the subsequent second step and/or fourth step, and the remaining portion of component (B) and the whole portion of component (A) may be provided for the kneading in the first step. As a further example, a portion of component (A) and a portion of component (B) may be left unadded pending the kneading in the subsequent second step and/or fourth step, and the remaining portions of component (A) and component (B) may be provided for the kneading in the first step. It is to be noted that components (D), (E) and (F) are provided in their entireties to the kneading in the first step.

The kneading of at least a portion of component (B) in the first step constitutes a first characteristic feature of the process according to the second aspect of the present invention, and can provide an improved elongation after curing.

The second step, on the other hand, constitutes a second characteristic feature of the process according to the second aspect of the present invention, and is intended to add at least portion(s) of any remaining portion(s) of components (A) and/or (B) to the mixture obtained in the first step such that the mixture is diluted to achieve uniform dispersion of the silica before the heat treatment in the third step. The portion(s) of any remaining portion(s) of components (A) and/or (B), which is (are) to be provided to the second step, may amount preferably to from 30 to 100% by weight, particularly to from 50 to 100% by weight of the remaining portion(s). For the same reasons as in the first step, it is also necessary to conduct the kneading in the second step at a temperature not higher than 100° C., especially a temperature not higher than 80° C. In this second step, the kneading can also be conducted at room temperature.

The kneading of at least a portion of component (B) and at least a portion of component (C) together in the first step of the process according to the fourth aspect of the present invention constitutes a characteristic feature of the process according to the fourth aspect of the present invention, and the kneading of component (B) and component (C) in the first step can provide an improved elongation after curing.

Concerning the proportions of components (A) to (F) to be used for the kneading in this first step, the proportion of component (A) is preferably from 60 to 90% by weight, particularly from 70 to 80% by weight of its total proportion, the proportion of component (B) is preferably from 30 to 100% by weight, particularly from 40 to 70% by weight of its total proportion, and the proportion of component (C) is desirably from 50 to 100% by weight of its total proportion. Components (D), (E) and (F) are added in their entireties.

If components (A), (B) and (C) have any remaining portions, the remaining portions of components (B) and (C) are added in the third step.

The third step in the process according to the second aspect of the present invention and the second step in the process according to the fourth aspect of the present invention are each a heat-treatment step to remove the decomposition residue of component (E) and also remove component (F), and the heat treatment is conducted at 130 to 200° C. In general, the treatment time may be preferably from 1 to 4 hours, especially from 2 to 3 hours, although it depends considerably upon the kneading machine and scale and cannot not be specified in a wholesale manner.

Subsequent to the heat treatment, the resulting mixture is cooled down. If components (A) and/or (B) have any remaining portion(s) at the end of the second step in the process according to the second aspect of the present invention, such remaining portion(s) of components (A) and/or (B) and the whole portions of component (G) and component (H) are kneaded usually at room temperature (the fourth step). In the process according to the fourth aspect of the present invention, on the other hand, the remaining portion of component (A) and, if components (B) and/or (C) have any remaining portion(s) at the end of the first step, the remaining portion(s) of components (B) and/or (C), and the whole portions of components (G) and (H) are kneaded usually at room temperature (the third step). In this third step [namely, in the adding and kneading step of the individual components to be conducted subsequent to the heat treatment (the second step)], the adding and kneading operations of the individual components can be conducted together as a single operation, or the adding and kneading operations can each be divided into two or more operations and effected as plural operations.

No particular limitation is imposed on a kneading machine to be used for conducting kneading in the production processes according to the second and fourth aspects of the present invention. For example, a planetary mixer, kneader or the like can be used.

To the liquid silicone rubber compositions according to the first and third aspects of the present invention, it is also possible to add, as needed to extent not impairing the objects of the present invention, one or more of inorganic fillers such as crystalline silica, hollow fillers, silsesquioxane, fumed titanium dioxide, magnesium oxide, zinc oxide, iron oxides, aluminum hydroxide, magnesium carbonate, calcium carbonate, zinc carbonate, layer mica, carbon black, diatomaceous earth, and glass fibers; fillers obtained by surface-treating these fillers with an organosilicon compound such as an organoalkoxysilane compound, organochlorosilane compound, organosilazane compound or low molecular weight siloxane compound; silicone rubber powder and silicone resin powder; and other optional components, for example, organopolysiloxanes containing one Si-bonded hydrogen atom or alkenyl group per molecule, organopolysiloxanes containing neither any Si-bonded hydrogen atom nor any alkenyl group, organic solvents, creep-hardening preventing agents, plasticizers, thixotropic agents, pigments, dyes, anti-mold agents, and the like. These additional components can be added in the final steps (the fourth step in the case of the process according to the second aspect of the present invention, and the third step in the case of the process according to the fourth aspect of the present invention).

The viscosities of the liquid silicone rubber compositions according to the first and third aspects of the present invention may be preferably from 500 to 4,000 Pa·s, especially from 1,000 to 3,000 Pa·s at 25° C.

When molding or forming and curing the liquid silicone rubber compositions according to the first and third aspects of the present invention, the molding or forming conditions and the curing conditions can be selectively determined as desired. It is, however, preferred to cure them under a temperature condition of from 120 to 200° C.

Each of the silicone rubbers cured has a hardness of at least 75, preferably from 75 to 85, especially from 75 to 80 as measured by a type-A durometer and an elongation at break of at least 200%, preferably from 200 to 300%, especially from 220 to 270% as measured in accordance with the method prescribed under JIS K 6249.

EXAMPLES

Examples and Comparative Examples of the invention are given below by way of illustration and not by way of limitation. It is to be noted that the term "room temperature" means 25° C. in the following Examples and Comparative Examples.

Example 1

Charged into a kneader were a dimethylpolysiloxane capped at both backbone ends thereof with vinyldimethylsiloxy groups and having a viscosity of about 30,000 mPa·s at 25° C. (55 parts by weight), a dimethylpolysiloxane capped at both backbone ends thereof with trimethylsiloxy groups, containing vinylmethylsiloxane units at 10 mole % of the total siloxane units and having a viscosity of about 700 mPa·s at 25° C. (5 parts by weight), hexamethyldisilazane (8 parts by weight), water (2 parts by weight), and "Aerosil™ 300" having a specific surface area of about 300 $m^2/g$ as measured by the BET adsorption method (product of Nippon Aerosil Co., Ltd.; 40 parts by weight). Those components were then mixed at room temperature for 1 hour. Subsequently, the dimethylpolysiloxane capped at both backbone ends thereof with vinyldimethylsiloxy groups and having the viscosity of about 30,000 mPa·s at 25° C. (20 parts by weight) was added, followed by mixing at room temperature until the resulting mixture became uniform. The temperature was then raised to 150° C., at which the mixing was continued for 2 hours. The temperature was thereafter lowered to room temperature to obtain a base compound A.

Added then at room temperature to the base compound A (120 parts by weight) were the dimethylpolysiloxane capped at both backbone ends thereof with trimethylsiloxy groups, containing vinylmethylsiloxane units at 10 mole % of the total siloxane units and having the viscosity of about 700 mPa·s at 25° C. (7 parts by weight), a methylhydrogenpolysiloxane having a viscosity of 55 mPa·s at 25° C. and capped at both backbone ends thereof with trimethylsiloxy groups (the content of Si-bonded hydrogen atoms=1.12% by weight in terms of the hydrogen atoms in SiH groups based on the whole weight of the molecule; 3.6 parts by weight), 1-ethynylcyclohexanol (0.1 part by weight), and the coordination compound between chloroplatinic acid and divinyltetramethyldisiloxane (10 ppm in terms of platinum metal based on the total amount of the components).

The resulting mixture was then molded into a sheet of 2 mm thickness and cured at 120° C. for 10 minutes, followed by postcuring at 150° C. for 1 hour. Using the thus-obtained cured sheet, its rubber physical properties were measured by the methods prescribed under JIS K 6249. The results are shown in Table 1.

Comparative Example 1

Charged into a kneader were the dimethylpolysiloxane capped at both backbone ends thereof with vinyldimethylsiloxy groups and having the viscosity of about 30,000 mPa·s at 25° C. (60 parts by weight), hexamethyldisilazane (8 parts by weight), water (2 parts by weight), and "Aerosil™ 300" having the specific surface area of about 300 $m^2/g$ as measured by the BET adsorption method (product of Nippon Aerosil Co., Ltd.; 40 parts by weight). Those components were then mixed at room temperature for 1 hour. Subsequently, the dimethylpolysiloxane capped at both backbone ends thereof with vinyldimethylsiloxy groups and having the viscosity of about 30,000 mPa·s at 25° C. (15 parts by weight) was added, followed by mixing at room temperature until the resulting mixture became uniform. The temperature was then raised to 150° C., at which the mixing was continued for 2 hours. The temperature was thereafter lowered to room temperature to obtain a base compound B.

Added then at room temperature to the base compound B (120 parts by weight) were the dimethylpolysiloxane capped at both backbone ends thereof with trimethylsiloxy groups, containing vinylmethylsiloxane units at 10 mole % of the total siloxane units and having the viscosity of about 700 mPa·s at 25° C. (12 parts by weight), the methylhydrogenpolysiloxane having the viscosity of 55 mPa·s at 25° C. and capped at both backbone ends thereof with trimethylsiloxy groups (the content of Si-bonded hydrogen atoms=1.12% by weight in terms of the hydrogen atoms in SiH groups based on the whole weight of the molecule; 3.6 parts by weight), 1-ethynylcyclohexanol (0.1 part by weight), and the coordination compound between chloroplatinic acid and divinyltetramethyldisiloxane (10 ppm in terms of platinum metal based on the total amount of the components).

The resulting mixture was then molded into a sheet of 2 mm thickness and cured at 120° C. for 10 minutes, followed by the postcuring at 150° C. for 1 hour. Using the thus-obtained cured sheet, its rubber physical properties were measured as in Example 1. The results are shown in Table 1.

Comparative Example 2

Charged into a kneader were the dimethylpolysiloxane capped at both backbone ends thereof with vinyldimethylsiloxy groups and having the viscosity of about 30,000 mPa·s at 25° C. (55 parts by weight), the dimethylpolysiloxane capped at both backbone ends thereof with trimethylsiloxy groups, containing vinylmethylsiloxane units at 10 mole % of the total siloxane units and having the viscosity of about 700 mPa·s at 25° C. (5 parts by weight), hexamethyldisilazane (8 parts by weight), water (2 parts by weight), and "Aerosil™ 300" having the specific surface area of about 300 $m^2/g$ as measured by the BET adsorption method (product of Nippon Aerosil Co., Ltd.; 40 parts by weight). Those components were then mixed at room temperature for 1 hour. The temperature was then raised to 150° C., at which the mixing was continued for 2 hours.

Subsequently, the temperature was lowered to 100° C., and the dimethylpolysiloxane capped at both backbone ends thereof with vinyldimethylsiloxy groups and having the viscosity of about 30,000 mPa·s at 25° C. (20 parts by weight) was added. The resulting mixture was mixed until it became uniform, whereby a base compound C was obtained.

Added then at room temperature to the base compound C (120 parts by weight) were the dimethylpolysiloxane capped at both backbone ends thereof with trimethylsiloxy groups, containing vinylmethylsiloxane units at 10 mole % of the total siloxane units and having the viscosity of about 700 mPa·s at 25° C. (7 parts by weight), the methylhydrogenpolysiloxane having a viscosity of 55 mPa·s at 25° C. and capped at both backbone ends thereof with trimethylsiloxy groups (the content of Si-bonded hydrogen atoms=1.12% by weight in terms of the hydrogen atoms in SiH groups based on the whole weight of the molecule; 3.6 parts by weight), 1-ethynylcyclohexanol (0.1 part by weight), and the coordination compound between chloroplatinic acid and divinyltetramethyldisiloxane (10 ppm in terms of platinum metal based on the total amount of the components).

The resulting mixture was then molded into a sheet of 2 mm thickness and cured at 120° C. for 10 minutes, followed by the postcuring at 150° C. for 1 hour. Using the thus-obtained cured sheet, its rubber physical properties were measured as in Example 1. The results are shown in Table 1.

TABLE 1

|  | Example 1 | Comparative Example 1 | Comparative Example 2 |
|---|---|---|---|
| Viscosity of composition (Pa · s) | 2,500 | 2,500 | 1,800 |
| Specific gravity (23° C.) | 1.16 | 1.16 | 1.16 |
| Hardness (durometer; type A) | 80 | 80 | 80 |
| Elongation at break (%) | 260 | 190 | 180 |
| Tensile strength (MPa) | 10 | 10 | 9 |

Example 2

Charged into a kneader were the dimethylpolysiloxane capped at both backbone ends thereof with vinyldimethylsiloxy groups and having the viscosity of about 30,000 mPa·s at 25° C. (50 parts by weight), the dimethylpolysiloxane capped at both backbone ends thereof with trimethylsiloxy groups, containing vinylmethylsiloxane units at 10 mole % of the total siloxane units and having the viscosity of about 700 mPa·s at 25° C. (5 parts by weight), a dimethylpolysiloxane capped at both backbone ends thereof with trimethylsiloxy groups and having a viscosity of about 100 mPa·s at 25° C. (5 parts by weight), hexamethyldisilazane (8 parts by weight), water (2 parts by weight), and "Aerosil™ 300" having the specific surface area of about 300 m²/g as measured by the BET adsorption method (product of Nippon Aerosil Co., Ltd.; 40 parts by weight). Those components were mixed at room temperature for 1 hour. Subsequently, the temperature was raised to 150° C., at which the mixing was continued for 2 hours to obtain a base compound D.

Added then at room temperature to the base compound D (100 parts by weight) were the dimethylpolysiloxane capped at both backbone ends thereof with vinyldimethylsiloxy groups and having the viscosity of about 30,000 mPa·s at 25° C. (20 parts by weight), the dimethylpolysiloxane capped at both backbone ends thereof with trimethylsiloxy groups, containing vinylmethylsiloxane units at 10 mole % of the total siloxane units and having the viscosity of about 700 mPa·s at 25° C. (7 parts by weight), the methylhydrogenpolysiloxane having the viscosity of 55 mPa·s at 25° C. and capped at both backbone ends thereof with trimethylsiloxy groups (the content of Si-bonded hydrogen atoms=1.12% by weight in terms of the hydrogen atoms in SiH groups based on the whole weight of the molecule; 3.6 parts by weight), 1-ethynylcyclohexanol (0.1 part by weight), and the coordination compound between chloroplatinic acid and divinyltetramethyldisiloxane (10 ppm in terms of platinum metal based on the total amount of the components).

The resulting mixture was then molded into a sheet of 2 mm thickness and cured at 120° C. for 10 minutes, followed by the postcuring at 150° C. for 1 hour. Using the thus-obtained cured sheet, its rubber physical properties were measured as in Example 1. The results are shown in Table 2.

Comparative Example 3

Charged into a kneader were the dimethylpolysiloxane capped at both backbone ends thereof with vinyldimethylsiloxy groups and having the viscosity of about 30,000 mPa·s at 25° C. (60 parts by weight), hexamethyldisilazane (8 parts by weight), water (2 parts by weight), and "Aerosil™ 300" having the specific surface area of about 300 m²/g as measured by the BET adsorption method (product of Nippon Aerosil Co., Ltd.; 40 parts by weight). Those components were then mixed at room temperature for 1 hour. The temperature was then raised to 150° C., at which the mixing was continued for 2 hours. Subsequently, the temperature was lowered to 100° C., followed by the addition of the dimethylpolysiloxane capped at both backbone ends thereof with vinyldimethylsiloxy groups and having the viscosity of about 30,000 mPa·s at 25° C. (10 parts by weight), the dimethylpolysiloxane capped at both backbone ends thereof with trimethylsiloxy groups, containing vinylmethylsiloxane units at 10 mole % of the total siloxane units and having the viscosity of about 700 mPa·s at 25° C. (5 parts by weight), and the dimethylpolysiloxane capped at both backbone ends thereof with trimethylsiloxy groups and having the viscosity of about 100 mPa·s at 25° C. (5 parts by weight). The resulting mixture was mixed until it became uniform, whereby a base compound E was obtained.

Added then at room temperature to the base compound E (120 parts by weight) were the dimethylpolysiloxane capped at both backbone ends thereof with trimethylsiloxy groups, containing vinylmethylsiloxane units at 10 mole % of the total siloxane units and having the viscosity of about 700 mPa·s at 25° C. (7 parts by weight), the methylhydrogenpolysiloxane having the viscosity of 55 mPa·s at 25° C. and capped at both backbone ends thereof with trimethylsiloxy groups (the content of Si-bonded hydrogen atoms=1.12% by weight in terms of the hydrogen atoms in SiH groups based on the whole weight of the molecule; 3.6 parts by weight), 1-ethynylcyclohexanol (0.1 part by weight), and the coordination compound between chloroplatinic acid and divinyltetramethyldisiloxane (10 ppm in terms of platinum metal based on the total amount of the components).

The resulting mixture was then molded into a sheet of 2 mm thickness and cured at 120° C. for 10 minutes, followed by the postcuring at 150° C. for 1 hour. Using the thus-obtained cured sheet, its rubber physical properties were measured as in Example 1. The results are shown in Table 2.

Comparative Example 4

Charged into a kneader were the dimethylpolysiloxane capped at both backbone ends thereof with vinyldimethylsiloxy groups and having the viscosity of about 30,000 mPa·s at 25° C. (55 parts by weight), the dimethylpolysiloxane capped at both backbone ends thereof with trimethylsiloxy groups and having the viscosity of about 100 mPa·s at 25° C. (5 parts by weight), hexamethyldisilazane (8 parts by weight), water (2 parts by weight), and "Aerosil™ 300" having the specific surface area of about 300 m²/g as measured by the BET adsorption method (product of Nippon Aerosil Co., Ltd.; 40 parts by weight). Those components were then mixed at room temperature for 1 hour. The temperature was then raised to 150° C., at which the mixing was continued for 2 hours. The temperature was then lowered to 100° C., followed by the addition of the dimethylpolysiloxane capped at both backbone ends thereof with vinyldimethylsiloxy groups and having the viscosity of about 30,000 mPa·s at 25° C. (15 parts by weight) and the dimethylpolysiloxane capped at both backbone ends thereof with trimethylsiloxy groups, containing vinylmethylsiloxane units at 10 mole % of the total siloxane units and having the viscosity of about 700 mPa·s at 25° C. (5 parts by weight). The resulting mixture was mixed until it became uniform, whereby a base compound F was obtained.

Added then at room temperature to the base compound F (120 parts by weight) were the dimethylpolysiloxane capped at both backbone ends thereof with trimethylsiloxy groups, containing vinylmethylsiloxane units at 10 mole % of the total siloxane units and having the viscosity of about 700 mPa·s at 25° C. (7 parts by weight), the methylhydrogenpolysiloxane having the viscosity of 55 mPa·s at 25° C. and capped at both backbone ends thereof with trimethylsiloxy groups (the content of Si-bonded hydrogen atoms=1.12% by weight in terms of the hydrogen atoms in SiH groups based on the whole weight of the molecule; 3.6 parts by weight), 1-ethynylcyclohexanol (0.1 part by weight), and the coordination compound between chloroplatinic acid and divinyltetramethyldisiloxane (10 ppm in terms of platinum metal based on the total amount of the components).

The resulting mixture was then molded into a sheet of 2 mm thickness and cured at 120° C. for 10 minutes, followed by the postcuring at 150° C. for 1 hour. Using the thus-obtained cured sheet, its rubber physical properties were measured as in Example 1. The results are shown in Table 2.

TABLE 2

|  | Example 2 | Comparative Example 3 | Comparative Example 4 |
|---|---|---|---|
| Viscosity of composition (Pa · s) | 1,800 | 2,000 | 1,800 |
| Specific gravity (23° C.) | 1.16 | 1.16 | 1.16 |
| Hardness (durometer; type A) | 80 | 80 | 80 |
| Elongation at break (%) | 250 | 170 | 180 |
| Tensile strength (MPa) | 9 | 9 | 9 |

This application claims the priorities of Japanese Patent Application 2004-176424 filed Jun. 15, 2004 and Japanese Patent Application 2004-176432 filed Jun. 15, 2004, both of which are incorporated herein by reference.

The invention claimed is:

1. An addition reaction-curable liquid silicone rubber composition capable of imparting a cured product having a high hardness comprising,
  (A) 80 to 90% by weight, based on the sum of component (A) and component (B), of an organopolysiloxane containing at least one Si-bonded vinyl group only at each end of a backbone thereof and having a viscosity of from 1 to 1,000 Pa·s at 25° C.,
  (B) 10 to 20% by weight, based on the sum of component (A) and component (B), of an organopolysiloxane containing at least two Si-bonded vinyl groups only in side chains on a backbone thereof and having a viscosity of from 0.1 to 100 Pa·s at 25° C., the amount of siloxane units having the vinyl groups being from 2 to 20 mole % of the total siloxane units of organopolysiloxane (B),
  (D) 35 to 55 parts by weight, per 100 parts by weight of the sum of component (A) and component (B), of finely divided silica having a specific surface area of at least 50 m$^2$/g,
  (E) 3 to 15 parts by weight, per 100 parts by weight of the sum of component (A) and component (B), of hexamethyldisilazane,
  (F) 0.5 to 5 parts by weight, per 100 parts by weight of the sum of component (A) and component (B), of water,
  (G) an organohydrogenpolysiloxane containing at least two Si-bonded hydrogen atoms per molecule, the organohydrogenpolysiloxane being contained in a proportion such that the number of the Si-bonded hydrogen atoms contained per molecule of component (G) becomes from 1.0 to 5.0 per each Si-bonded vinyl group contained in the organopolysiloxanes of component (A) and component (B), and
  (H) a catalytic amount of a hydrosilation catalyst;
  the silicone rubber composition being cured into a product having a hardness of at least 75 as measured by a type-A durometer and an elongation at break of at least 200%.

2. A process for preparing an addition reaction-curable liquid silicone rubber composition comprising,
  (A) 80 to 90% by weight, based on the sum of component (A) and component (B), of an organopolysiloxane containing at least one Si-bonded vinyl group only at each end of a backbone thereof and having a viscosity of from 1 to 1,000 Pa·s at 25° C.,
  (B) 10 to 20% by weight, based on the sum of component (A) and component (B), of an organopolysiloxane containing at least two Si-bonded vinyl groups only in side chains on a backbone thereof and having a viscosity of from 0.1 to 100 Pa·s at 25° C., the amount of siloxane units having the vinyl groups being from 2 to 20 mole % of the total siloxane units of organopolysiloxane (B),
  (D) 35 to 55 parts by weight, per 100 parts by weight of the sum of component (A) and component (B), of finely divided silica having a specific surface area of at least 50 m$^2$/g,
  (E) 3 to 15 parts by weight, per 100 parts by weight of the sum of component (A) and component (B), of hexamethyldisilazane,
  (F) 0.5 to 5 parts by weight, per 100 parts by weight of the sum of component (A) and component (B), of water,
  (G) an organohydrogenpolysiloxane containing at least two Si-bonded hydrogen atoms per molecule, the organohydrogenpolysiloxane being contained in a proportion such that the number of the Si-bonded hydrogen atoms contained per molecule of component (G) becomes from 1.0 to 5.0 per each Si-bonded vinyl group contained in the organopolysiloxanes of component (A) and component (B), and
  (H) a catalytic amount of a hydrosilation catalyst;
  wherein the process of preparing the silicone rubber composition comprises the following first to fourth steps (1) to (4):
  (1) kneading at a temperature of up to 100° C. at least a portion of component (A) and at least a portion of component (B), with proviso that the portions of component (A) and component (B) are not the whole portions thereof at the same time, and the whole portions of components (D), (E) and (F);
  (2) adding at least portion(s) of any remaining portion(s) of component (A) and component (B) to a mixture obtained in step (1), and kneading the resulting mixture at a temperature of up to 100° C.;
  (3) subjecting the mixture, which has been obtained in step (2), to heat treatment at from 130 to 200° C.; and
  (4) kneading, in the mixture subjected to the heat treatment, the whole portions of components (G) and (H) and any remaining portion(s) of component (A) and component (B) at the end of the step (2).

3. An addition reaction-curable liquid silicone rubber composition comprising,
   (A) 70 to 89% by weight, based on the sum of component (A), component (B) and component (C), of an organopolysiloxane containing at least one Si-bonded vinyl group only at each end of a backbone thereof and having a viscosity of from 1 to 1,000 Pa·s at 25° C.,
   (B) 10 to 20% by weight, based on the sum of component (A), component (B) and component (C), of an organopolysiloxane containing at least two Si-bonded vinyl groups only in side chains on a backbone thereof and having a viscosity of from 0.1 to 100 Pa·s at 25° C., the amount of siloxane units having the vinyl groups being from 2 to 20 mole % of the total siloxane units of organopolysiloxane (B),
   (C) 1 to 10% by weight, based on the sum of component (A), component (B) and component (C), of a non-functional dimethylpolysiloxane represented by the following formula (3):

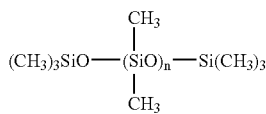
(3)

wherein n denotes a number sufficient to give polysiloxane (G) a viscosity of from 0.01 to 1 Pa·s at 25° C.,
   (D) 35 to 55 parts by weight, per 100 parts by weight of the sum of component (A), component (B) and component (C), of finely divided silica having a specific surface area of at least 50 m²/g,
   (E) 3 to 15 parts by weight, per 100 parts by weight of the sum of component (A), component (B) and component (C), of hexamethyldisilazane,
   (F) 0.5 to 5 parts by weight, per 100 parts by weight of the sum of component (A), component (B) and component (C), of water,
   (G) an organohydrogenpolysiloxane containing at least two Si-bonded hydrogen atoms per molecule, the organohydrogenpolysiloxane being contained in a proportion such that the number of the Si-bonded hydrogen atoms contained per molecule of component (G) becomes from 1.0 to 5.0 per each Si-bonded vinyl group contained in the organopolysiloxanes of component (A) and component (B), and
   (H) a catalytic amount of a hydrosilation catalyst;
   the silicone rubber composition being cured into a product having a hardness of at least 75 as measured by a type-A durometer and an elongation at break of at least 200%.

4. A process for preparing an addition reaction-curable liquid silicone rubber composition comprising,
   (A) 70 to 89% by weight, based on the sum of component (A), component (B) and component (C), of an organopolysiloxane containing at least one Si-bonded vinyl group only at each end of a backbone thereof and having a viscosity of from 1 to 1,000 Pa·s at 25° C.,
   (B) 10 to 20% by weight, based on the sum of component (A), component (B) and component (C), of an organopolysiloxane containing at least two Si-bonded vinyl groups only in side chains on a backbone thereof and having a viscosity of from 0.1 to 100 Pa·s at 25° C., the amount of siloxane units having the vinyl groups being from 2 to 20 mole % of the total siloxane units of organopolysiloxane (B),
   (C) 1 to 10% by weight, based on the sum of component (A), component (B) and component (C), of a non-functional dimethylpolysiloxane represented by the following formula (3):

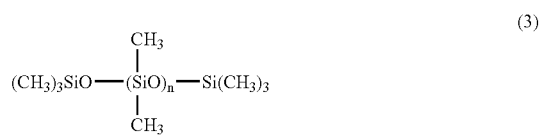
(3)

wherein n denotes a number sufficient to give polysiloxane (G) a viscosity of from 0.01 to 1 Pa·s at 25° C.,
   (D) 35 to 55 parts by weight, per 100 parts by weight of the sum of component (A), component (B) and component (C), of finely divided silica having a specific surface area of at least 50 m²/g,
   (E) 3 to 15 parts by weight, per 100 parts by weight of the sum of component (A), component (B) and component (C), of hexamethyldisilazane,
   (F) 0.5 to 5 parts by weight, per 100 parts by weight of the sum of component (A), component (B) and component (C), of water,
   (G) an organohydrogenpolysiloxane containing at least two Si-bonded hydrogen atoms per molecule, the organohydrogenpolysiloxane being contained in a proportion such that the number of the Si-bonded hydrogen atoms contained per molecule of component (G) becomes from 1.0 to 5.0 per each Si-bonded vinyl group contained in the organopolysiloxanes of component (A) and component (B), and
   (H) a catalytic amount of a hydrosilation catalyst;
   wherein the process of preparing the silicone rubber composition comprises the following first to third steps (1) to (3):
   (1) kneading at a temperature of up to 100° C. a portion of component (A), at least a portion of component (B), at least a portion of component (C), and the whole portions of components (D), (E) and (F);
   (2) subjecting a kneaded compound, which has been obtained in step (1), to heat treatment at from 130 to 200° C.; and
   (3) kneading, in the kneaded compound subjected to the heat treatment, the whole portions of components (G) and (H), the remaining portion of component (A), and any remaining portion(s) of component (B) and component (C).

* * * * *